July 30, 1946.　　　　J. L. KIMBALL　　　　2,404,849
REGULATOR
Filed Nov. 1, 1944　　　　2 Sheets-Sheet 1

INVENTOR.
James L. Kimball

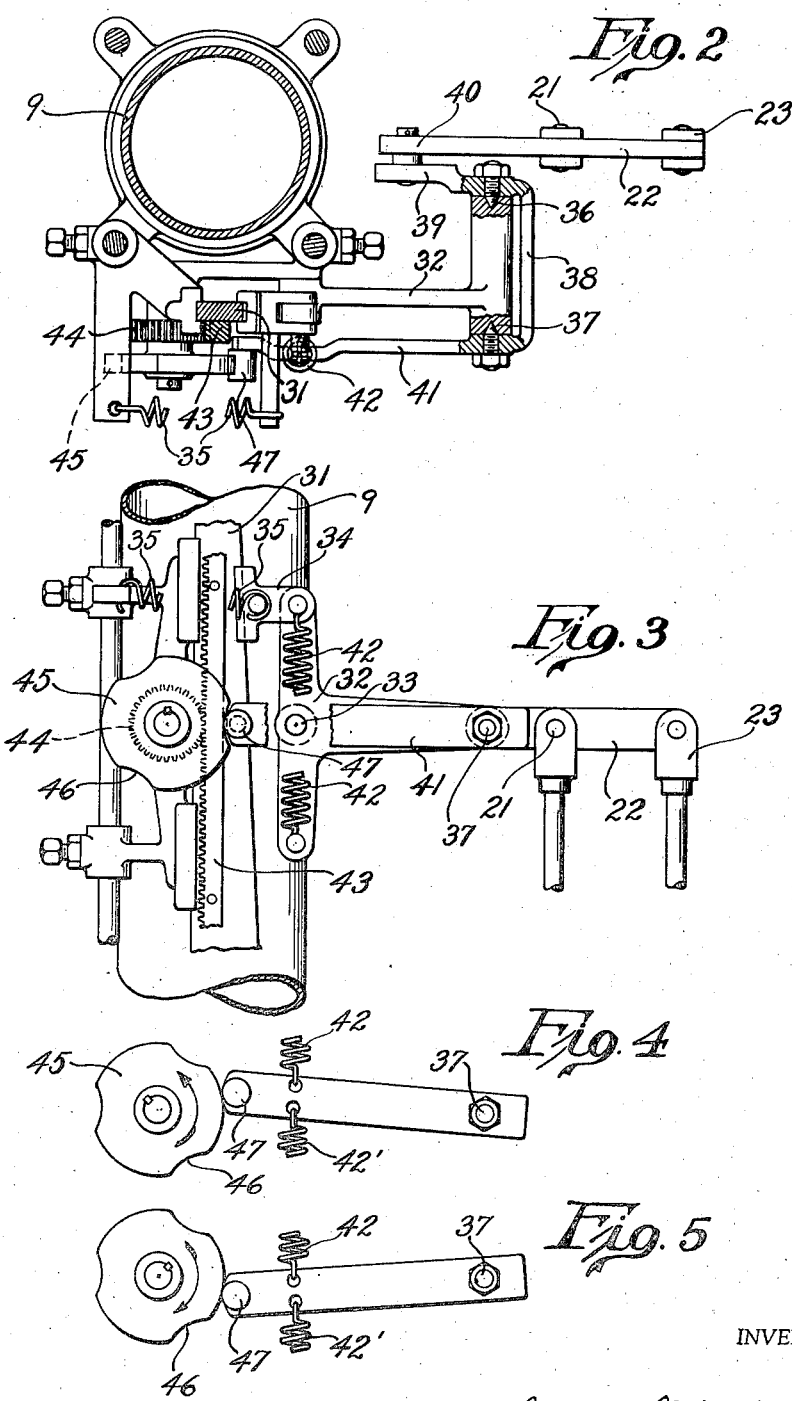

Patented July 30, 1946

2,404,849

UNITED STATES PATENT OFFICE 2,404,849

REGULATOR

James L. Kimball, Danvers, Mass., assignor to Ruggles-Klingemann Mfg. Co., Salem, Mass.

Application November 1, 1944, Serial No. 561,445

5 Claims. (Cl. 121—41)

My present invention relates to regulators of the general character described and claimed in Patent No. 2,378,410 of June 19, 1945.

One of the objects of my present invention is in simplifying the construction and in making more effective the step action operation as disclosed in the above referred to patent. Another object is in disclosing improved means for controlling dampers, valves and other pressure or temperature control devices. This improved step action regulator was primarily developed for the operation of drum controllers and the like, used in the operation of variable speed motor control. The object being to avoid slow movement of the servo motor and consequent burning of the contact fingers. However, experience has shown that the invention with certain novel changes as disclosed in my present invention is equally useful in preventing hunting action due principally to response lag.

Due to transportation lag of a fluid system under regulator control, there will result a response lag between the correction of a deficiency by the control means, such as a damper valve or rheostat and the appreciation of such correction by the regulator. Such response lags, including that of the regulator, are the principal cause of sustained hunting action. As an example, assuming a case of damper control in boiler operation, the time lag between the adjustment of the damper and the result of such adjustment in the correction of the steam pressure will ordinarily result in an over correction by the damper controlling means, in other words, the return motion of the conventional follow-up will be too slow to center the pilot valve at its neutral position and the servo motor will move to an over correcting position. In my present invention the time period in opening the pilot valve to a wide position after the first initial opening and in the closing movement have been reduced to a minimum, the rapid opening movement tending to minimize transportation lag and the rapid closing movement tending to minimize regulator over correction.

In the drawings Fig. 1, shows a side elevation, parts such as the diaphragm chamber, pilot valve and servo motor piston, being shown in section. The regulator is shown operatively connected to a damper, valve and rheostat and may be used for operating one or all of these control devices.

Fig. 2 shows a plan view of the follow-up return motion with a step action operating member supported thereon.

Fig. 3 shows an elevation of the step action and follow-up members. The quick throw arm being broken away to show pivot point of the follow-up member.

Fig. 4 illustrates the action of the cam in operating the quick throw arm when the servo motor is operating in an upward direction, and Fig. 5 illustrates the action of the cam in operating the quick throw arm when the servo motor is operating on the downward stroke.

Figure 1:
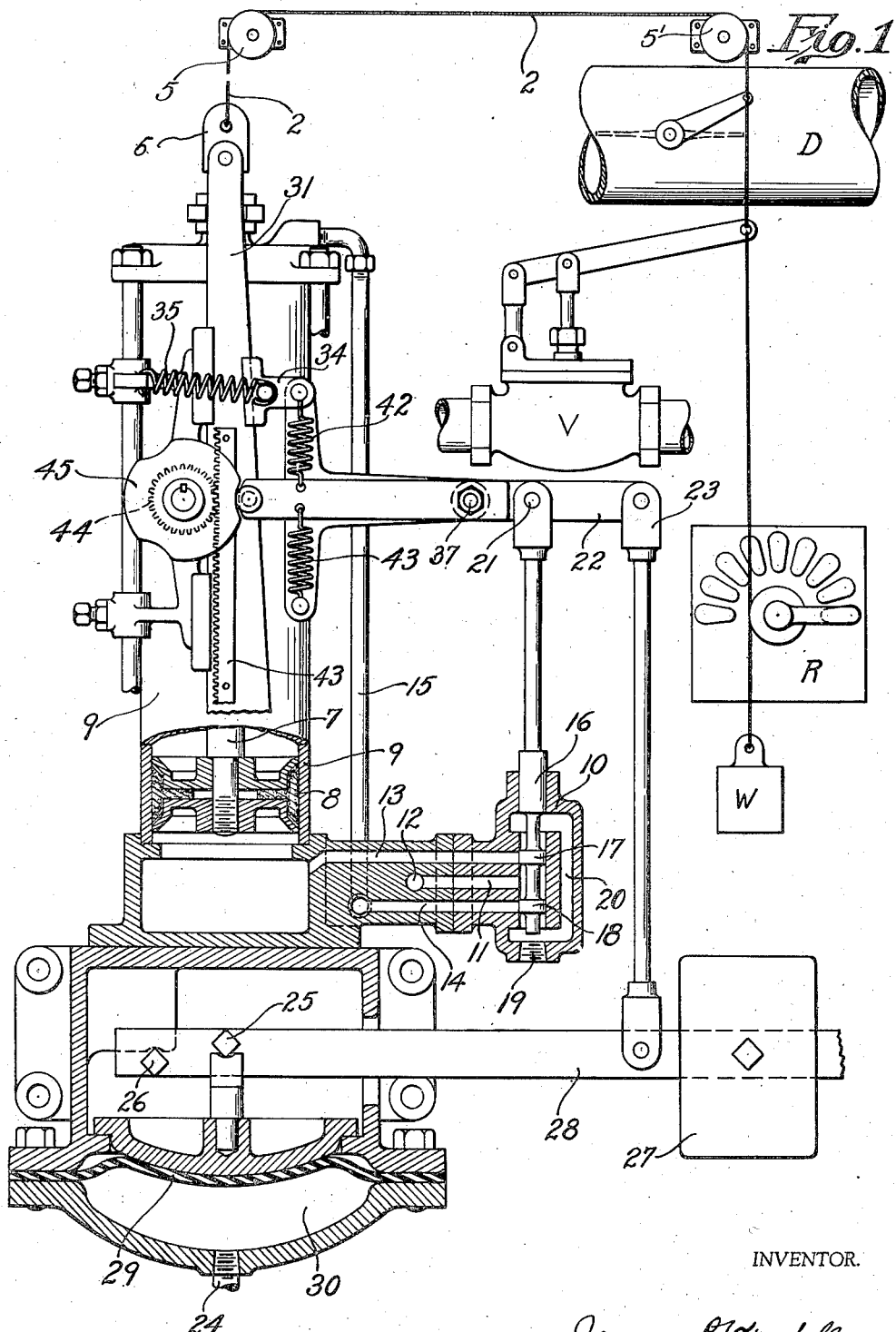

My invention is applicable to any type of fluid pressure operated regulator and is preferably adapted to regulators having what is commonly referred to as a follow-up return method of compensated control, the principal object of the invention being accomplished by a novel additional control preferably associated with the follow-up.

Referring to Fig. 1, D designates a damper; V, a valve; and R, a rheostat; these constitute main control members for controlling variations in a fluid system, one or all of which may be operated from my improved regulator as required.

I will now describe the operation of a regulator of the type embodied in my invention, having a follow-up return motion control.

A cable, chain, or other connecting means 2 extends over shives 5 and 5' and is operatively connected to levers or other operating means of the damper D, valve V, and rheostat R. A counterweight W operates these main control members in one direction only. The cable or other connecting means is secured to a link 6 at the upper end of piston rod 7.

Piston rod 7 has a piston 8 at its lower end which is adapted to reciprocate in cylinder 9 and constitutes a fluid pressure servo-motor having a reciprocatory motion for the operation of the main control members. A pilot valve 10 has an inlet port 11 to which is connected a source of fluid under pressure at 12 for operating the servo motor, a delivery port 13 extends to the under side of piston 8 and delivery port 14 extends to upper end of cylinder 9 above piston 8 through conduit 15.

A sliding piston valve 16 has spaced cylindrical portions 17 and 18 which control the admission and exhaust of fluid under pressure to and from opposite ends of the servo motor cylinder 9. When valve 16 is raised, fluid is admitted past the lower edge of cylindrical portion 17 to port 13 and to the under side of piston 8, at the same time the lower side of cylindrical portion 18 is moved upward permitting the exhaust of fluid from the upper end of cylinder 9 through conduit 15 and port 14 thence to exhaust connection 19. This operation causes piston 8 to move upward. When valve 16 is lowered fluid is admitted past the upper edge of cylindrical portion 18 thence through port 14 and conduit 15 to the top of cylinder 9 and at the same time fluid is exhausted from the bottom of cylinder 9 through port 13 and past the upper edge of cylindrical portion 17 thence through passage 20 to exhaust connection 19. This operation causes piston 8 to move downward. Valve 16 is pivotally connected at 21 with a floating lever 22. The right hand end of floating lever 22 has pivotally mounted connecting rod 23 which connects the floating lever 22 with weighted beam 28 of a pressure responsive device. Variations in pressure in chamber 30 acting on a diaphragm 29 actuate weighted beam 28 through knife edge fulcrum positions 25 and 26 to raise or lower floating lever 22 and consequently valve 16 to thereby operate the servomotor a counter weight 27 is adjustable on beam 28 in counter-acting the pressure setting of the regulator. A further description of the invention will be clear if it is understood that an upward movement of valve 16 through an increase in pressure on diaphragm 29 means an upward movement of piston 8 and likewise a downward movement of valve 16 through a reduction in pressure on diaphragm 29 means a downward movement of piston 8.

In order to obtain the maximum effectiveness of the step action principle a relatively wide lapping of the ports 13 and 14 by the cylindrical portions 17 and 18 is desirable. This not only insures a positive step of operation but provides a definite dwell, or non-responsive action, at each of the step positions which compensate for time lag by acting as an equilibrator after each step of operation before moving to a succeeding step position.

I will next describe the operation from the follow-up return motion, a wedge 31 is connected at its upper end to link 6 secured to piston rod 7 said wedge having reciprocating motion corresponding to that of piston 8, a bell crank 32 is pivoted to a suitable stationary support at 33 (see Fig. 3) has a shoe 34 held in contact with wedge 31 by means of spring 35 and is adapted to rock bell crank 32 with the upward and downward movement of piston 8 and connecting wedge 31. There is pivoted at the right hand end of bell crank 32 (see Fig. 2) at points 36 and 37 a yoked member 38 having a short arm 39 movable with that of bell crank 32, floating lever 22 being connected to this arm at pivot point 40.

Assuming an increase in pressure in chamber 30 causing an upward movement of valve 16, piston 8 and its connecting wedge 31, shoe 34 in following the angle of wedge 31 will be forced to the right causing the right hand end of bell crank 32 to be lowered, which in turn lowers the left hand end of floating lever 22 thus returning the valve 16 to a neutral position. On a reduction of pressure in chamber 11 the reverse operation takes place valve 16 is lowered below its neutral position and the right hand end of floating lever 22 is raised to again return the valve 16 to neutral position, neutral position as above referred to meaning a mid position between two effective positions to which the initial operation of the motor is effected.

The operation of this class of regulators having a follow-up compensated control is generally referred to as floating regulation as distinguished from "step action" regulators disclosed in my earlier patents.

It will be understood from the description of the operation thus far given that piston 8 of the servo motor could be operated in a slow motion or a relatively rapid motion depending on the nature of the impulse in pressure change acting on diaphragm 29 in chamber 30 and likewise the stopping of the piston 8, or the point at which a reversal of operation might take place, could be at any position between the limits of operation of the servo motor.

My invention resides in part in means associated with the follow-up compensating means adapted to effect an abrupt relatively high speed operation of the servo motor between definite steps of operation in either direction and consists of an additional control supported wholly by the follow-up which I will now describe.

My invention includes an additional control for actuating the left hand end of floating lever 22 to thereby effect an abrupt operation of the pilot valve 16 to cause a relatively high speed operation of piston 8 for a definite step of operation regardless of the nature of the initial impulse acting on diaphragm 29. To accomplish this object I provide an operating member 38 having a long arm 41 equipoised at a neutral position by resilient means such as springs 42 and 42' a gear rack 43 is attached to wedge 31 and drives a gear pinion 44 attached to an operating cam 45. This operating cam 45 has three notched depressions equally spaced positions 46 at its periphery, any number can be used depending on the length of step required.

These notches at the periphery of cam 45 are engaged by a projection 47 at the left hand end of long arm 41. This projection such as a stud or roll assumes an equilibrium or neutral position by means of the balancing springs 42 and 42' attached to said arm when stud 47 engages notches 46.

The operation of the cam 45 and its associated members will be best understood by a reference to Fig. 4 and Fig. 5. Assuming an upward movement of piston 8, as would be the case with an increase in pressure acting on diaphragm 29, then cam 45 would be operated counter clockwise and arm 41 would assume a position as shown in Fig. 4. This operation would raise pivot point 40 and operate floating lever 22 to thereby open the pilot valve ports an amount in excess of its initial opening. Likewise on a downward motion of piston 8 as on a decrease in pressure on diaphragm 29, cam 45 will be operated in a clock-wise direction and arm 41 will assume a position as shown in Fig. 5, further opening the ports of valve 16 for the downward stroke. This additional control for effecting step by step operation of the servo motor cooperates with the follow-up compensating means in the following manner.

Assuming the initial opening of the pilot valve 16 is 1/64" of an inch, which would be sufficient to give a slow motion to the servo motor piston 8, and the additional opening effected by the operation of cam 45 is 1/16" of an inch effecting a more rapid motion of piston 8, at the same time the return motion of the follow-up effected by wedge 31, for the step of operation, will be the same as the initial opening plus the amount of lap between the neutral position and its effective position, consequently when projection 47 engages notch 46 allowing arm 41 to assume its equilibrium position, the pilot valve will have been returned to its neutral position to await a further variation in pressure on diaphragm 29 for a further operation of the servo motor.

It is possible that the change in pressure acting on diaphragm 29 could be sufficient to operate the pilot valve stem 16 so far above or below its neutral position that the return motion of the follow-up wedge 31 would not be sufficient to bring the valve 16 back to a neutral position in a single step of operation. However, when the stopping point is reached it would be at a step position corresponding at a step position under normal operation. The invention has by way of example been illustrated and described as a pressure control regulator, it is to be understood, however, that the invention may be applied to other regulating combinations, as for example by replacing the diaphragm with a thermostat element it may be used as a temperature control. In accordance with the provisions of the rules of practice of the Patent Office, I have described the principle of operation of my invention, together with the apparatus which I now consider to represent a preferred embodiment thereof; but I desire to have it understood that the apparatus shown is only illustrative and is capable of various modifications and that only such limitations shall be imposed as are indicated in the appended claims.

I claim:

1. In a regulator having a fluid pressure operated motor and a valve adapted to control the flow of working fluid to said motor, a floating lever coupled with said valve, an actuator movable in response to changes in the conditions governed by the regulator, operatively connected with said floating lever to transmit motion thereto, a second lever pivoted on a stationary fulcrum, means operated by the motor and engaged with said second lever for imparting movement thereto, a coupling member carried by the second lever in pivotal connection therewith at a distance from the fulcrum thereof and in motion-imparting connection with the floating lever, and a cam driven by the motor acting on said coupling member to move said member relatively to the second lever.

2. The combination with a fluid pressure actuated motor, a valve controlling the supply of working fluid to the motor, and a plurality of motion-imparting elements connected for operation by the motor, of a movable member mounted to receive motion from one of said motion-imparting elements, a coupling member mounted on the before named member with capability of independent movement relatively thereto and operatively associated with another of said motion-imparting elements to be actuated thereby, an actuator movable in response to changes in conditions to be governed by said motor, and a floating lever in connection with said actuator, coupling member and valve.

3. In a regulator, a fluid pressure operated motor, a valve adapted to control the flow of pressure fluid for operating the motor, a floating lever connected with said valve for imparting movement to the valve, an actuator coupled to the floating lever at a point at one side of the point where the connection from the valve to the floating member is made, a bell crank pivoted at a fixed point with respect to the motor, a yoke member pivotally connected with one arm of said bell crank at a location displaced from the fulcrum of the bell crank and having an arm which is pivoted to the floating lever at the opposite side of its connection with the valve from the side at which the connecting point of the floating lever with said actuator is located, a wedge member connected to be moved by the motor and arranged to bear on another arm of said bell crank to impart movement thereto, and a cam also connected to be driven by the motor engaged with a part of said yoke to impart movement thereto about the pivotal connection of the yoke with the bell crank.

4. In a regulator having a fluid pressure operated motor and a valve adapted to control the flow of working fluid to said motor for operating the motor in either of two directions, a floating lever coupled with said valve, an actuator movable in response to changes in the conditions governed by the regulator, operatively connected with said floating lever to transmit motion thereto, a second lever pivoted on a stationary fulcrum, means operated by the motor and engaged with said second lever for imparting movement thereto, a coupling member carried by the second lever in pivotal connection therewith at a distance from the fulcrum thereof and in motion-imparting connection with the floating lever, and a cam driven by the motor acting on said coupling member to move said member in one or the opposite direction relatively to the second lever.

5. In a regulator having a fluid pressure operated motor and a valve adapted to control the flow of working fluid to said motor for operating said motor in either of two directions, a floating lever coupled with said valve, an actuator movable in response to changes in the conditions governed by the regulator, operatively connected with said floating lever to transmit motion thereto, a second lever pivoted on a stationary fulcrum, means operated by the motor and engaged with said second lever for imparting movement thereto. A coupling member carried by the second lever in pivoted connection therewith at a distance from the fulcrum thereof and in motion-imparting connection with the floating lever, said coupling member being equipoised relatively to the second lever by resilient means, and a cam driven by the motor acting on said coupling member to move said member in one or the opposite direction relatively to the second lever.

JAMES L. KIMBALL.